A. WINTON.
OIL COOLER.
APPLICATION FILED SEPT. 11, 1912.

1,121,885.

Patented Dec. 22, 1914.
2 SHEETS—SHEET 2.

UNITED STATES PATENT OFFICE.

ALEXANDER WINTON, OF CLEVELAND, OHIO, ASSIGNOR TO WINTON GAS ENGINE AND MANUFACTURING COMPANY, OF CLEVELAND, OHIO.

OIL-COOLER.

1,121,885.            Specification of Letters Patent.         Patented Dec. 22, 1914.

Application filed September 11, 1912. Serial No. 719,847.

*To all whom it may concern:*

Be it known that I, ALEXANDER WINTON, a citizen of the United States, residing at Cleveland, in the county of Cuyahoga and State of Ohio, have invented certain new and useful Improvements in Oil-Coolers, of which the following is a specification, reference being had therein to the accompanying drawing.

This invention relates to improvements in combined oil filters and coolers, and is particularly intended for use with an explosion engine, for taking the collected oil from the engine after it is used, filtering and cooling it and re-circulating it in its filtered and cooled condition to the parts of the engine needing lubrication, thus making a continuous filtering, cooling and lubricating system.

Figure 1:
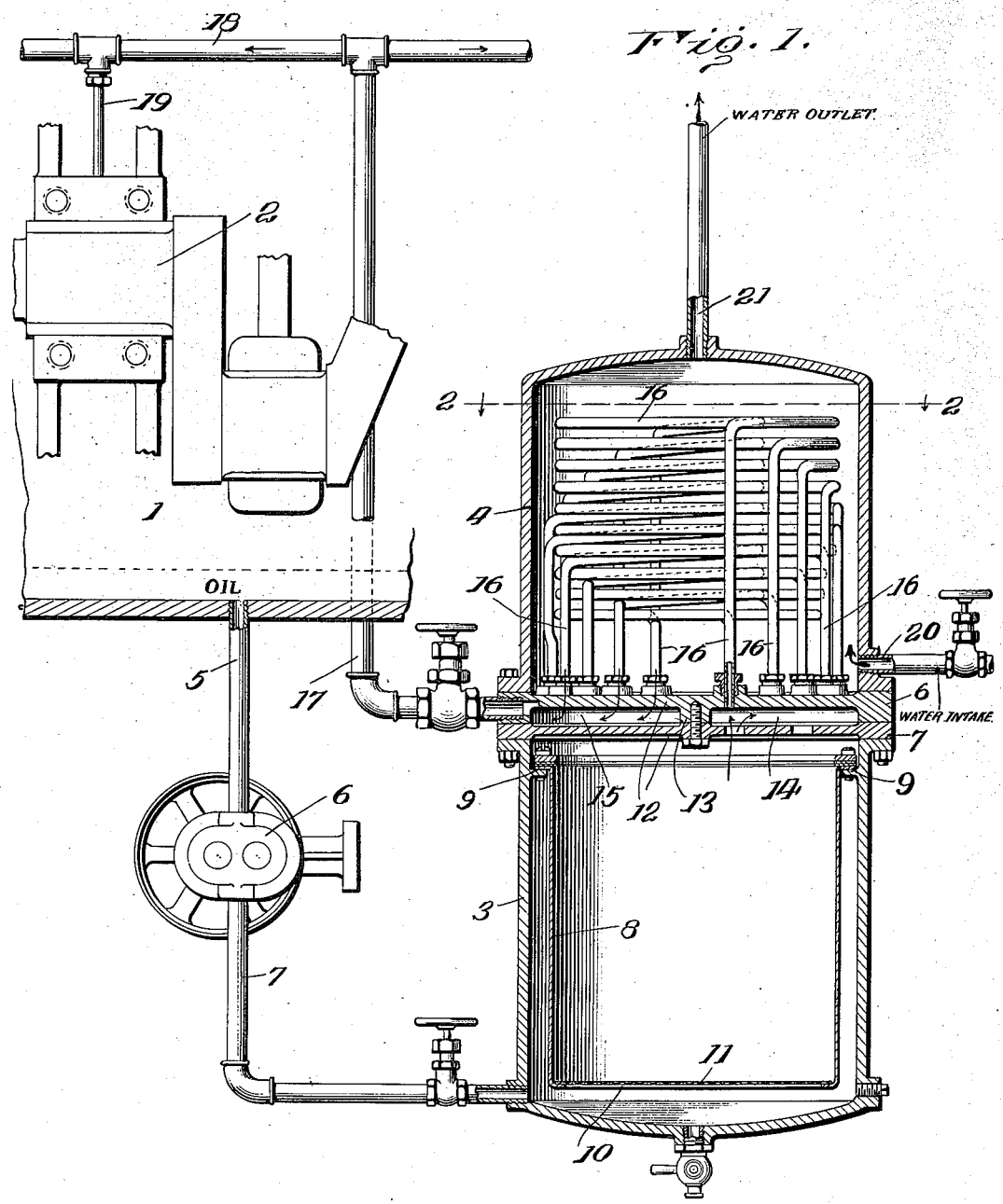
Figure 2:
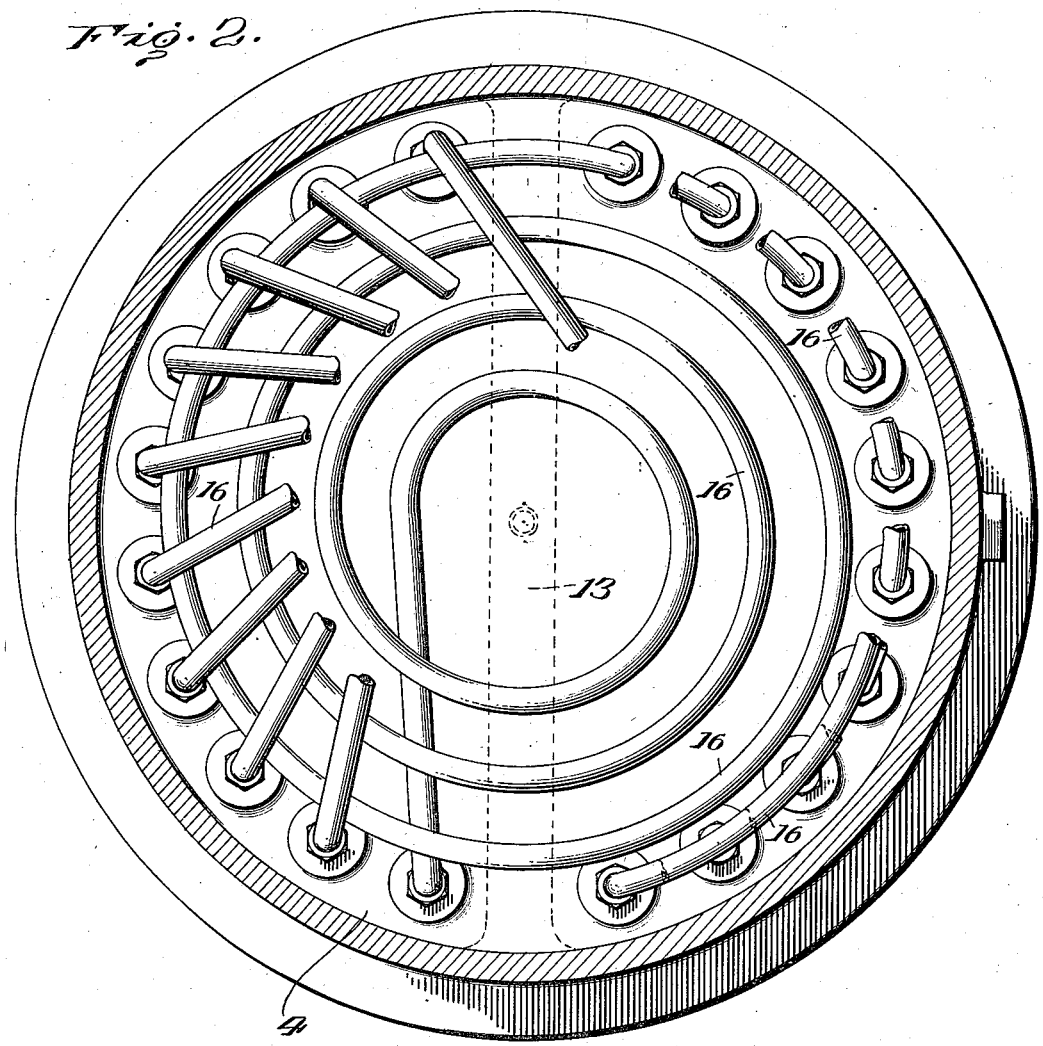

In the accompanying drawings—Figure 1 is a side elevation of an oil filter and cooler containing the present improvement, a portion of the explosion engine-crank case and crank being shown in connection therewith. Fig. 2 is a cross-sectional view on the line 2—2 of Fig. 1.

Referring now to the drawings, 1 indicates a portion of the engine crank case containing a part of the engine crank-shaft 2. In the use of my improved oil filter and cooler, the water or oil after it is used for lubricating the engine is collected in the crank-case, as shown in dotted line and marked "Oil."

My improvement comprises a vertically arranged case, the lower portion 3 of which is an oil receiving and filtering chamber and the upper portion 4 an oil cooling chamber. The oil collected in the crank case 1, is taken therefrom through a pipe 5, by means of a pump 6, which will be driven by the engine in any suitable manner. The pump 6 forces the oil through the pipe 7 to the filtering chamber 3. This filtering chamber contains a depending tubular member 8, which has its upper edge 9 turned laterally and an oil-tight connection made between the lateral edge 9 and the upper end of the filtering case 3. The lower end of the tubular member 8 is open, as shown at 10, and this open end is closed by a filtering screen 11. Located between the filtering chamber 3 and cooling chamber 4, are two parallel walls 12, forming a space between them, and this space is divided by a transverse rib 13 forming the space into an inlet passage 14 and an outlet passage 15. Coils of pipe 16, of which there are a suitable number, have one end communicating with the inlet chamber 14 and the other ends communicating with the outlet chamber 15. The outlet chamber communicates with a pipe 17, which in turn communicates with what may be termed a distributing pipe 18 from which the distributing passages 19 extend to the various points of the engine to be lubricated.

Water is supplied to the cooling chamber 4 and circulated around the coils of pipe 16 to cool them, and the oil passing therethrough, and this water circulation is through an inlet pipe 20 into the lower end of the chamber 4, and out through an outlet pipe 21 at the upper end of the chamber 4. Water is supplied to the inlet pipe 20 in any desired manner for its circulation through the chamber 4.

In operation the oil is taken from the crank case 1, by the pump and forced into the lower end of the chamber 3, through the screen 11 into the inlet passage 14 through the cooling oils 16 to the outlet passage 15, and from this passage through the pipes 17, 18 and 19 to the points of the engine that require lubrication.

Having thus described my invention, what I claim and desire to secure by Letters Patent is:

An oil cooler comprising a cooling chamber, means for circulating water therethrough, an oil receiving chamber having inlet openings in its bottom communicating with the oil supply, an auxiliary receiving compartment and a discharge compartment adjacent thereto, the said compartments between the oil receiving chamber and cooling chamber, the auxiliary oil receiving compartment having openings in its bottom communicating with the receiving chamber, and a plurality of coil pipes within the cooling chamber having their ends in communication with the auxiliary receiving chamber and their other ends in communication with the discharge chamber, the parts arranged as and for the purpose described.

In testimony whereof I hereunto affix my signature in the presence of two witnesses.

ALEXANDER WINTON.

Witnesses:
HAROLD B. ANDERSON,
BYRON B. BROCKMAN.